United States Patent [19]

Kondo et al.

[11] Patent Number: 4,769,405

[45] Date of Patent: Sep. 6, 1988

[54] AQUEOUS SILICONE EMULSION COATING MATERIAL

[76] Inventors: Hidetoshi Kondo, Ichihara; Taro Koshii, Chiba, both of Japan; Toray Silicone Company, Ltd., 03, Tokyo, Japan

[21] Appl. No.: 132,506

[22] Filed: Dec. 14, 1987

Related U.S. Application Data

[63] Continuation-in-part of Ser. No. 22,901, Mar. 6, 1987, abandoned.

[51] Int. Cl.$^4$ .................................................. C08L 1/00
[52] U.S. Cl. .................................... 524/35; 524/10; 524/12; 524/21; 524/36; 524/860; 524/861; 524/862
[58] Field of Search ................ 524/35, 36, 21, 10, 524/12, 860, 861, 862

[56] References Cited

U.S. PATENT DOCUMENTS

| | | | |
|---|---|---|---|
| 4,100,124 | 7/1978 | Ichikawa et al. | 260/29.2 |
| 4,221,688 | 9/1980 | Johnson et al. | 260/29.2 |
| 4,228,054 | 10/1980 | Ona et al. | 260/29.2 |
| 4,248,751 | 2/1981 | Willing | 260/29.2 |
| 4,496,687 | 1/1985 | Okada et al. | 524/859 |
| 4,572,917 | 2/1986 | Graiver et al. | 521/68 |

OTHER PUBLICATIONS

Japanese Patent Application Laid Open No. 50-13426, 50-65533, and 56-36546, (56-16553).
Japanese Patent Application No. 59-36677, (56-32651 and 56-38609).

*Primary Examiner*—Melvyn I. Marquis
*Attorney, Agent, or Firm*—Edward C. Elliott

[57] ABSTRACT

An aqueous silicone emulsion coating material has been developed with can be used to form a membrane with a decorative, uneven surface. The decorative surface is durable and waterproof. The coating material consists essentially of aqueous silicone emulsion which gives an elastomer upon removal of the water component, inorganic filler, and short, hydrophilic, organic fibers.

7 Claims, No Drawings

AQUEOUS SILICONE EMULSION COATING MATERIAL

This is a continuation-in-part of application Ser. No. 022,901, filed Mar. 6, 1987 and now abandoned.

BACKGROUND OF THE INVENTION

1. Field of the Invention

The present invention relates to an aqueous silicone emulsion coating material suitable for the execution of a rough, uneven design and which cures by means of the removal of the water component to form a film coating which has an excellent durability and waterproofness.

2. Background Information

It is known that coating compositions constituted of an aqueous emulsion of acrylic resin or urethane resin, inorganic filler and fiber will form a waterproof film while simultaneously forming a rough, uneven design when sprayed and cured on the interior or exterior wall surfaces of buildings (for example, Japanese patent application Laid-Open Nos. 50-13426[75-13426] and 50-65533[75-65533]. Japanese Patent Publication No. 54- 32651[79-32651] and Japanese patent application Laid-Open No. 50- 133235[75-133235]).

U.S. Pat. No. 4,496,687, issued Jan. 29, 1985, teaches a siloxane containing emulsion which can give an elastomer upon removal of water. The composition is stated as useful as a coating composition, fiber treating agent, binder for inorganic material and the like.

U.S. Pat. No. 4,572,917, issued Feb. 25, 1986, teaches a method of manufacturing a fiber reinforced silicone foam. An aqueous silicone emulsion is combined with inorganic fibers and frothed.

However, while coating materials constituted of acrylic resins or urethane resins will form a coating film by means of curing, the weather resistance of such a film is itself unsatisfactory, and the physical properties of the film gradually deteriorate during long-term exposure to ultraviolet rays and the film thus loses its elasticity. As a result, cracks appear in the cured coating film and the aesthetics as a coating material are adversely affected. In particular, rain leakage occurs when precipitation penetrates the cracks to enter the interior of the building. In addition, such film coatings have very small elongations at low temperatures and are thus prohibited from application in cold regions.

Accordingly, various methods were examined by the present inventors in order to eliminate the aforementioned problems and the present invention was developed as a result.

SUMMARY OF THE INVENTION

This invention relates to an aqueous silicone emulsion coating material comprising an aqueous silicone emulsion which cures to a silicone elastomer upon removal of the water, inorganic filler, and short, hydrophilic, organic fiber. When coated on a wall and dried, the material forms a membrane with a decorative. uneven surface while also giving excellent durability and waterproofness.

An object of the present invention is to provide an aqueous silicone emulsion coating material which is suitable for execution in a rough, uneven design and which cures to form a very durable and waterproof film coating by means of removal of the water component.

DESCRIPTION OF THE INVENTION

This invention concerns an aqueous silicone emulsion coating material consisting essentially of (A) 100 parts by weight of aqueous silicone emulsion which gives an elastomer upon removal of the water component, (B) 10 to 200 parts by weight inorganic filler and (C) 0.1 to 10 parts by weight hydrophilic, organic fiber selected from the group consisting of natural fibers, regenerated fibers, and synthetic fibers, said fibers having a length of from 0.1 to 10 millimeters. This invention concerns a method of forming a membrane with a decorative, uneven surface which is also durable and waterproof consisting essentially of (1) applying an aqueous silicone emulsion coating material consisting essentially of (A) 100 parts by weight of aqueous silicone emulsion which gives an elastomer upon removal of the water component, (B) 10 to 200 parts by weight inorganic filler and (C) 0.1 to 10 parts by weight hydrophilic, organic fiber selected from the group consisting of natural fibers, regenerated fibers, and synthetic fibers, said fibers having a length of from 0.1 to 10 millimeters and (2) removing the water component.

The coating material of the present invention consists of an aqueous silicone emulsion coating material which is constituted of inorganic filler, short, hydrophilic, organic fiber and an aqueous silicone emulsion which gives a rubbery elastomer by means of the removal of the water component. As a consequence, it is characterized by an excellent sprayability, and by curing by means of the removal of the water component to form a very durable and waterproof coating film; while at the same time being suitable for execution in a rough, uneven design. Accordingly, it is very useful as a decorative material, protective coating material, waterproofing material or paint for application to various architectural elements and to various civil engineering and building structures.

By way of explanation, the component (A) to be used in the present invention is an aqueous silicone emulsion having the capacity to form a rubbery elastic film coating by curing by means of the removal of the water component. Any such emulsions known in the art may be used. This component encompasses compositions of hydroxyl-containing silicone polymer emulsion, colloidal silica and organotin catalyst (for example. Japanese patent application Laid-Open No. 56-16553[81-16553] equivalent to U.S. Pat. No. 4,221,688, issued Sept. 9, 1980); compositions of vinyl-containing silicone polymer emulsion, SiH-containing silicone polymer emulsion and platinum catalyst (for example, Japanese patent application Laid-Open No. 56-36546[81-36546] equivalent to U.S. Pat. No. 4,248,751, issued Feb. 3, 1981); compositions in which cyclic siloxane and organofunctional silane have been emulsion polymerized (for example. Japanese Patent Publication No. 56-38609[81-38609] equivalent to U.S. Pat. No. 4,228,054, issued Oct. 14, 1980); and compositions of hydroxyl-containing silicone polymer emulsion. hydrolyzable silane and curing catalyst (for example. Japanese Patent Publication No. 59-36677[84-36677] equivalent to U.S. Pat. No. 4,100,124, issued July 11, 1978).

In the present invention, compositions with the following constituent components are preferred from among the above because they rapidly cure and dry at room temperature and have excellent storage stability as the single-package coating material.

That is, the preferred composition is an aqueous silicone emulsion consisting essentially of (i) essentially linear organopolysiloxane having at least 2 silicon-bonded hydroxyl groups in each molecule; (ii) crosslinker for component (i), selected from the group consisting of colloidal silica, alkali metal silicate, hydrolyzable silane and the partial hydrolysis- condensation product of hydrolyzable silane; (iii) curing catalyst; (iv) emulsifier; and (v) water.

The organopolysiloxane comprising component (i) is crosslinked by component (ii) to form a rubbery elastomer. It is to be a silicone polymer which contains at least 2 silicon-bonded hydroxyl groups in each molecule. The position of these hydroxyl groups is not specifically restricted, but they are preferably present at both terminals. Other silicon-bonded organic groups are unsubstituted or substituted monovalent hydrocarbon groups as exemplified by alkyl groups such as methyl, ethyl, propyl and butyl; alkenyl groups such as vinyl, and allyl; aryl groups such as phenyl; aralkyl groups such as benzyl; alkaryl groups such as styryl and tolyl; cycloalkyl groups such as cyclohexyl and cyclopentyl; and these groups in which all or part of the hydrogen atoms have been substituted by halogen such as fluorine, chlorine or bromine, for example, 3-chloropropyl and 3,3,3-trifluoropropyl. In general, these monovalent hydrocarbon groups will be methyl, vinyl and phenyl, and particularly methyl, but all groups need not be identical and combinations of different species of monovalent hydrocarbon groups can be employed. The molecular structure must be essentially linear, meaning linear or linear with a small degree of branching. The molecular weight is not specifically restricted, but molecular weights above 5,000 are preferred. A reasonable tensile strength and elongation can be achieved at molecular weights exceeding 30,000, and the most preferred tensile strength and elongation can be achieved at molecular weights exceeding 50,000. Concrete examples of this organopolysiloxane are hydroxyl-terminated dimethylpolysiloxanes, methylphenylpolysiloxanes, dimethylsiloxane-methylphenylsiloxane copolymers, methylvinylpolysiloxanes and dimethylsiloxanemethylvinylsiloxane copolymers. Such organopolysiloxanes can be synthesized, for example, by the ring-opening polymerization of cyclic organosiloxane, by hydrolyzing a linear or branched organopolysiloxane having hydrolyzable groups such as alkoxy groups or acyloxy groups, or by hydrolyzing 1 or 2 or more species of diorganodihalosilanes.

Component (ii) functions as the crosslinker for component (i). With regard to this component, the colloidal silica is exemplified by fumed colloidal silica, precipitated colloidal silica and colloidal silica with a particle size of 0.0001 to 0.1 micrometers which has been stabilized with sodium, ammonia or aluminum ions. The colloidal silica is used at 1 to 150 weight parts and preferably 1.0 to 70 weight parts per 100 weight parts organopolysiloxane comprising component (i).

The alkali metal silicate is preferably a water-soluble alkali metal silicate and is preferably made into the aqueous solution before use. The alkali metal silicates are exemplified by, for example, lithium silicate, sodium silicate, potassium silicate and rubidium silicate. It is used at 0.3 to 30 weight parts and preferably 0.3 to 20 weight parts per 100 weight parts organopolysiloxane comprising component (i).

The hydrolyzable silane or partial hydrolysis-condensation product thereof which may constitute component (ii) must contain at least 3 silicon-bonded hydrolyzable groups in each molecule. An elastomer cannot be produced in the case of fewer than 3 silicon-bonded hydrolyzable groups. The hydrolyzable groups are exemplified by, for example, alkoxy groups such as methoxy, ethoxy and butoxy; acyloxy groups such as acetoxy; substituted or unsubstituted acetamide groups such as acetamide and N-methylaceamide; alkenyloxy groups such as propenoxy; substituted amino groups such as N,N-dimethylamino and N,N-diethylamino; and ketoxime groups such as methyl ethyl ketoxime. This substance is exemplified by methyltrimethoxysilane, vinyltrimethoxysilane, n-propyl orthosilicate, ethyl polysilicate and propyl polysilicate. The use of mixtures of 2 or more of these materials is possible in any application. This component is generally blended at 1 to 150 weight parts per 100 weight parts organopolysiloxane comprising component (i).

The curing catalyst comprising component (iii) promotes the condensation reaction of component (i) with component (ii) and its examples include the metal salts of organic acids such as dibutyltin dilaurate, dibutyltin diacetate, tin octenoate, dibutyltin dioctoate, tin laurate, ferric stannooctenoate, lead octenoate, lead laurate and zinc octenoate; titanic acid esters such as tetrabutyl titanate, tetrapropyl titanate and dibutoxytitanium bis-(ethyl acetoacetate); and amine compounds such as n-hexylamine and guanidine and their hydrochloride salts. Furthermore, these curing catalysts are preferably converted into emulsions in advance by the usual methods using both emulsifier and water.

Component (iii) is generally added at 0.01 to 1.5 weight parts and preferably 0.05 to 1 weight parts per 100 weight parts organopolysiloxane comprising component (i).

The emulsifier comprising component (iv) principally has the purpose of emulsifying component (i), and it encompasses anionic emulsifiers, nonionic emulsifiers and cationic emulsifiers. Anionic emulsifiers are, for example, higher fatty acid salts, higher alcohol sulfate ester salts, alkylbenzenesulfonate salts, alkylnaphthalenesulfonate salts, alkylsulfones and polyethylene glycol sulfate ester salts; nonionic emulsifiers are, for example, polyoxyethylene alkylphenyl ethers, sorbitan fatty acid esters, polyoxyethylene sorbitan fatty acid esters, polyoxyalkylene fatty acid esters, polyoxyethylenepolyoxypropylenes and fatty acid monoglycerides; and the cationic emulsifiers are, for example, aliphatic amine salts, quaternary ammonium salts and alkylpyridinium salts. These emulsifiers can be used singly or as mixtures of 2 or more species. The quantity of use is generally 0.2 to 30 weight parts per 100 weight parts organopolysiloxane comprising component (i).

There is no specific limitation on the water comprising component (v) as long as it is used in sufficient quantity to emulsify components (i) to (iii) under the activity of component (iv).

The inorganic filler to be used as component (B) in the present invention functions to adjust the fluidity or viscosity of the coating material of the present invention to an appropriate level and, in particular, it functions in combination with component (C) to be discussed below to provide the suitability for execution in a rough, uneven design. Such materials are exemplified by calcium carbonate, clay, aluminum oxide, aluminum hydroxide, ground silica, mica, titanium dioxide, zinc oxide, and barium sulfate. The filler does not include colloidal silica, alkaline metal silicate, or the partial hydrolysis-condensation product of hydrolyzable silane, all of which are a part of the aqueous silicone emulsion (A).

The average particle size of this inorganic filler is preferably 10 microns or less. It is to be blended at 10 to 200 weight parts and preferably 40 to 120 weight parts per 100 weight parts component (A).

The fiber to be used as component (C) in the present invention is essential for imparting a suitable fluidity and improved workability to the invention's coating material, and at the same time for making the coating material of the present invention suitable for the execution of a rough, uneven design. The fiber has a length of from 0.1 to 10 millimeters. Its quantity of addition is 0.1 to 50 weight parts, preferably 0.1 to 10 weight parts, and preferably 0.3 to 10 weight parts per 100 weight parts component (A). Execution of a rough, uneven design becomes difficult at below 0.1 weight part, while exceeding 50 weight parts is undesirable because the workability is reduced and the short fiber itself will appear in a fibrous design on the cured film coating. The fiber is selected from the group consisting of natural fibers, regenerated fibers, and synthetic fibers. Natural fibers include pulp, cotton, flax, silk, and wool. Regenerated fibers are such as rayon. Synthetic fibers include nylon, vinylon, and polyester. Of these, cellulosic, hydrophilic, organic fibers such as rayon and pulp, are preferred.

The addition of a dispersant to the coating material of the present invention is optional depending on the goal. Such a dispersant functions to prevent aggregative destruction of the emulsion particles and to prevent the appearance of an insoluble fraction during the addition of components (B) and/or (C) to the aqueous silicone emulsion comprising component (A), or during mixing after this addition, and acts to disperse the filler particles homogeneously. This is generally a protective colloid and polyphosphate salts such as sodium tripolyphosphate, sodium tetraphosphate, sodium hexametaphosphate, sodium polymetaphosphate and sodium tetrapolyphosphate; the formalin condensate of sodium alkylnaphthalenesulfonate; low molecular- weight ammonium polyacrylate; low molecular-weight styrene-ammonium maleate copolymers; casein; sodium ligninsulfonate; polyvinyl alcohol; sodium polyacrylate; polyvinyl pyrrolidone; glycidyl methacrylate; and cellulosic derivatives such as methylcellulose, hydroxyethylcellulose and carboxymethylcellulose are known as examples. Of these, sodium polyacrylate, glycidyl methacrylate and sodium tetrapolyphosphate are particularly effective. It may be preferable for accomplishing the object that this component be added to the aqueous silicone emulsion in advance, before addition of the filler. Alternatively, it may be preferable for accomplishing the object that the surface(s) of components (B) and/or (C) be treated with dispersant in advance of addition. Methods for treating components (B) and (C) can roughly be classified into dry and wet methods. When the surface of component (B) and/or (C) is uniformly and evenly coated with dispersant molecules by either method, a preferred aqueous silicone emulsion coating material composition is produced without any accompanying problems from aggregative destruction of the emulsion particles, poor dispersion of components (B) and (C) or the appearance of insoluble component.

Sodium polyacrylate, glycidyl methacrylate and sodium tetrapolyphosphate are particularly preferred as dispersants for use in the aforementioned surface treatments.

In addition, a viscosity regulator may optionally be added to the coating material of the invention depending on the target properties. This includes sizes such as carboxymethylcellulose, methylcellulose, hydroxyethylcellulose and polyvinyl alcohol and, in addition, the use of acrylic emulsion thickeners is possible. Its quantity of addition is approximately 0.01 to 1.0 wt %. At below 0.01 wt %, the viscosity will be low and in some cases a rough, uneven design cannot be formed. On the other hand, large quantities reduce the fluidity and the surface of the film coating will not spread out: craters and pinholes will remain and small patterns will remain on the surface of the rough, uneven design. Accordingly, a smooth finish cannot be obtained. With a further increase in viscosity, spraying from the spray gun becomes impossible in some cases.

The aqueous silicone emulsion coating material of the present invention can be produced, for example, as follows. First, the aqueous silicone emulsion comprising component (A) is prepared from the aforementioned components (i) to (v). Methods known in the art can be employed for this. For example, component (A) may be produced by emulsifying an hydroxyl-terminated polydimethylsiloxane, etc., in water, the component (v), by means of an emulsifying device such as a homomixer, homogenizer or colloid mill using the emulsifier comprising component (iv), followed by adding and mixing component (ii) (colloidal silica, alkali metal silicate or hydrolyzable silane or the partial hydrolysis- condensation product thereof) and the curing catalyst comprising component (iii). Otherwise, component (A) may be produced by emulsifying a cyclic organopolysiloxane, for example, octamethylcyclotetrasiloxane, in water using an emulsifier, followed by the addition of a ring-opening polymerization catalyst and polymerization at elevated temperatures to produce an emulsion of hydroxyl-terminated diorganopolysiloxane. Component (ii) (colloidal silica, alkali metal silicate or hydrolyzable silane or the partial hydrolysis-condensation product thereof) and the curing catalyst comprising component (iii) are then added. These methods are not specifically restricted, but, for example, a base emulsion composition of 100 weight parts hydroxyl-containing organopolysiloxane as component (i); 1 to 150 weight parts colloidal silica or 0.3 to 30 weight parts alkali metal silicate, or 1 to 150 weight parts hydrolyzable silane or partial hydrolysis-condensation product thereof as component (ii); a catalytic quantity of curing catalyst as component (iii); 0.2 to 30 weight parts emulsifier as component (iv); and water as component (v) is to be prepared. The pH of this base emulsion composition is then adjusted to 9 to 12. This adjustment can be conducted, for example, by adding an amine such as diethylamine or ethylenediamine or an alkali metal hydroxide such as sodium hydroxide or potassium hydroxide, and organic amine is preferred. In addition to the above, examples of such organic amines are monoethanolamine, triethanolamine, morpholine and 2-amino-2-methyl-1-propanol. This is followed by ripening for a specified period of time. The ripening temperature is to be a temperature at which the emulsion is not destroyed, that is, 10° to 95° C. and preferably 15° to 50° C. The length of the ripening period is conditioned by the requirement that an elastomeric substance will be formed when water is removed from the base emulsion composition, and in actual practice is, for example, 25° C. for a week or more or 40° C. for 4 days or more.

This is then combined and mixed with the viscosity regulator and the dispersant and then with components (B) and (C), or alternatively, the viscosity regulator is added, followed by the addition and mixing of components (B) and (C) whose surfaces have been treated with dispersant in advance. This affords the target aqueous silicone emulsion coating material.

Components which are generally added and blended into water-based paints, for example, defoaming agents, pigments, dyes, preservatives and penetrants (such as aqueous ammonia, etc.), can be added and blended into aqueous silicone emulsion coating materials based on the production method of the present invention.

The aqueous silicone emulsion coating material obtained as above has an excellent stability at room temperature and cures into an elastomer at room temperature by means of the removal of the water component.

The method of utilization of the coating material of the present invention will be considered next. For example, the invention's coating material may be filled into a spray gun, sprayed on the surfaces of building walls and then allowed to stand as is to dry and cure. An undercoat is not required here, but a base treatment with primer in the case of a poor substrate can improve adhesion and prevent swelling. Also, a final coat is not required, but a final coat can be applied when a facing with a beautifying effect is desired on the coating surface.

The following examples are included for illustrative purposes only and should not be construed as limiting the invention, which is properly set forth in the appended claims. In the examples, parts signifies parts by weight.

EXAMPLE 1

Two parts sodium laurate emulsifier and 70 parts water were mixed into 100 parts hydroxyl-terminated dimethylpolysiloxane having 30 siloxane repeat units, this was passed through a homogenizer twice at a pressure of 300 kg/cm$^2$, 1 part dodecylbenzenesulfonic acid was added as polymerization initiator, and this was then emulsion polymerized at room temperature for 10 hours. The pH was then adjusted to 7 using aqueous sodium hydroxide to obtain an emulsion (dimethylpolysiloxane emulsion I) which contained hydroxyl-terminated dimethylpolysiloxane with a molecular weight of approximately 200,000. Five parts colloidal silica, 3.5 parts 2-amino- 2-methyl-1-propanol and 0.1 part dioctyltin dilaurate were added to 100 parts of this emulsion, and it was then allowed to stand for 7 days in order to obtain a latex-like aqueous silicone emulsion (solids, 55 weight percent).

This emulsion was blended with suspensible calcium carbonate, sedimentable calcium carbonate and fumed silica in the quantities reported in Table 1, and then blended with vinylon short fiber (fiber length, 0.5 to 3.0 mm) or rayon short fiber (fiber length, 2.0 mm) in the quantities reported in Table 1.

The obtained aqueous silicone emulsion coating material was filled into a spray gun from Iwata Tosoki Kogyo KK [Iwata Air Compressor Mfg. Co., Ltd.] and then sprayed on a test wall material under an air pressure of 4 to 5 kg/cm$^2$ in order to evaluate the sprayability. The test wall material consisted of a slate board to which a silane primer (Primer B from Toray Silicone Co., Ltd.) had been applied as a substrate-treatment agent, followed by drying.

This aqueous silicone emulsion coating material was also diluted with an appropriate quantity of water to reduce the viscosity, and this was uniformly and evenly sprayed on test wall material as above, and then cured for 14 days in a thermostatted room at 20° C. at RH 55% in order to measure the external appearance, adhesive strength, weather resistance and water permeability of the paint film. These results are reported in Table 1.

For comparison, the same evaluations and measurements as above were conducted on an aqueous silicone emulsion coating material prepared as above, but omitting the short fiber, and on aqueous silicone emulsion coating materials prepared as above, but increasing the blended quantity of inorganic filler or short fiber. These results are also reported in Table 1.

The evaluation and measurement methods are as follows.

1. Sprayability

During the spraying operation, it was investigated whether the aqueous silicone emulsion coating material flowed smoothly from the spray gun's pot to the nozzle and could be utilized without waste to the last without residue on the pot's walls. Also, dripping from the nozzle tip was investigated.

2. Status of the rough, uneven design

After first spraying flat and then spraying beads, the status of the obtained rough, uneven design is inspected visually.

3. Adhesive strength and water permeability

In accordance with JIS A-6910.

4. Weather resistance

A test piece coated with the aqueous silicone emulsion coating material is exposed in a sunshine carbon-arc weatherometer for 300 hours. The discoloration, decline in gloss, creases, swelling and peeling are then inspected visually, and chalking is evaluated by finger touch.

5. Hardness

In accordance with JIS K-6301.

6. Tensile strength and elongation

In accordance with JIS A-6021.

TABLE 1

|  | Experiment No. | | | | | |
|---|---|---|---|---|---|---|
|  | present invention | | | comparison examples | | |
|  | 1 | 2 | 3 | 4 | 5 | 6 |
| composition |  |  |  |  |  |  |
| aqueous silicone emulsion | 182 | 182 | 182 | 182 | 182 | 182 |
| suspensible calcium carbonate | 120 | 100 | 30 | 120 | 20 | 100 |
| sedimentable calcium carbonate |  |  | 100 |  |  | 100 |
| fumed silica |  |  | 4 |  |  |  |
| vinylon fiber | 2 |  |  |  |  |  |
| rayon fiber |  | 1 | 2 |  | 40 |  |
| viscosity regulator (sodium polyacrylate) |  | 0.2 | 1 |  |  | 2 |

TABLE 1-continued

| | Experiment No. | | | | | |
|---|---|---|---|---|---|---|
| | present invention | | | comparison examples | | |
| | 1 | 2 | 3 | 4 | 5 | 6 |
| Properties | | | | | | |
| sprayability | good | good | good | good | poor (dripping) | poor (clogging) |
| rough, uneven design | good | good | good | poor (collapse) | poor (dripping) | poor |
| adhesive strength kg/cm² | 11 | 10 | 12 | 11 | 7 | 12 |
| weather resistance | no abnormality | no abnormality | no abnormality | no abnormality | no abnormality | no abnormality |
| water permeability, mL | 0 | 0 | 0 | 0 | 0 | 0 |
| hardness, JIS A | 19 | 16 | 26 | 19 | 13 | 30 |
| tensile strength, kg/cm² | 12 | 10 | 10 | 12 | 7 | 18 |
| elongation, % | 770 | 730 | 420 | 850 | 210 | 320 |

EXAMPLE 2

One part vinyltrimethoxysilane and 0.1 part dioctyltin dilaurate catalyst were mixed with 100 parts dimethylpolysiloxane emulsion I (prepared as in Example 1) to obtain an aqueous silicone emulsion which was then blended with the same filler and short fiber as in Example 1, but in the quantities reported in Table 2. The various properties of the obtained aqueous silicone emulsion coating material were evaluated as in Example 1 and the results are reported in Table 2.

TABLE 2

| | experiment no. | |
|---|---|---|
| | 7 | 8 |
| composition | | |
| aqueous silicone emulsion | 170 | 170 |
| sedimentable calcium carbonate | 120 | 100 |
| fumed silica | 4 | 4 |
| rayon fiber | 1.5 | 2 |
| viscosity regulator (sodium polyacrylate) | 0.2 | 0.5 |
| properties | | |
| sprayability | good | good |
| rough, uneven design | good | good |
| adhesive strength, kg/cm² | 10 | 10 |
| weather resistance | no abnormality | no abnormality |
| water permeability, mL | 0 | 0 |
| hardness, JIS A | 12 | 10 |
| tensile strength, kg/cm² | 8 | 6 |
| elongation, % | 620 | 690 |

EXAMPLE 3

First, 170 parts dimethylpolysiloxane emulsion I prepared as in Example 1 were mixed with 0.5 parts n-propyl orthosilicate, 0.1 part dioctyltin dilaurate and a small amount of ethylene glycol to prepare an aqueous silicone emulsion composition. Mixing 120 parts sedimentable calcium carbonate and 2 parts rayon short fiber with this composition afforded an aqueous silicone emulsion coating material. This coating material was evaluated as in Example 1. A waterproof coating was formed with a good rough and uneven design.

EXAMPLE 4

First, 170 parts dimethylpolysiloxane emulsion I prepared as in Example 1 were mixed with 0.5 parts n-propyl orthosilicate, 0.1 part dioctyltin dilaurate and a small amount of ethylene glycol to prepare an aqueous silicone emulsion composition. This aqueous silicone emulsion was blended with suspensible calcium carbonate, sedimentable calcium carbonate, and fumed silica in the quantities shown in Table 3, and then blended with polyester short fiber (fiber length, 5.0 millimeters) or rayon short fiber (fiber length, 0.2 millimeters) in the quantities shown in Table 3. The resulting aqueous silicone emulsion coating material was evaluated as in Example 1, with the results a shown in Table 3.

TABLE 3

| | experiment no. | |
|---|---|---|
| | 9 | 10 |
| composition | | |
| aqueous silicone emulsion | 182 | 182 |
| suspensilble calcium carbonate | 40 | 40 |
| sedimentable calcium carbonate | 85 | 85 |
| fumed silica | 4 | 4 |
| polyester fiber | 2 | |
| rayon fiber | | 2 |
| viscosity regulator (sodium polyacrylate) | 2 | 2 |
| properties | | |
| sprayability | good | good |
| rough, uneven design | good | good |
| adhesive strength, kg/cm² | 8 | 8 |
| weather resistance | no abnormality | no abnormality |
| water permeability, mL | 0 | 0 |
| hardness, JIS A | 8 | 8 |
| tensile strength, kg/cm² | 9 | 11 |
| elongation, % | 600 | 680 |

That which is claimed is:

1. An aqueous silicone emulsion coating material consisting essentially of
   (A) 100 parts by weight of aqueous silicone emulsion which gives an elastomer upon removal of the water component,
   (B) 10 to 200 parts by weight inorganic filler and
   (C) 0.1 to 10 parts by weight hydrophilic, organic fiber selected from the group consisting of natural fibers, regenerated fibers, and synthetic fibers, said fibers having a length of from 0.1 to 10 millimeters.

2. An aqueous silicone emulsion coating material described in claim 1, wherein the aqueous silicone emulsion which gives an elastomer upon removal of the water component consists essentially of
   (i) essentially linear organopolysiloxane having at least 2 silicon-bonded hydroxyl groups in each molecule, (ii) crosslinker for component (i), selected from the group consisting of colloidal silica, alkali metal silicate, hydrolyzable silane and the partial hydrolysis-condensation product of hydrolyzable silane,
(iii) curing catalyst,
(iv) emulsifier and
(v) water.

3. A method of forming a membrane with a decorative, uneven surface which is also durable and waterproof consisting essentially of
   (1) applying an aqueous silicone emulsion coating material consisting essentially of
   (A) 100 parts by weight of aqueous silicone emulsion which gives an elastomer upon removal of the water component,
   (B) 10 to 200 parts by weight inorganic filler and
   (C) 0.1 to 10 parts by weight hydrophilic, organic fiber selected from the group consisting of natural fibers, regenerated fibers, and synthetic fibers, said fibers having a length of from 0.1 to 10 millimeters, and
   (2) removing the water component.

4. The composition of claim 1 in which (B) is 40 to 120 parts by weight.

5. The composition of claim 1 in which (C) is 0.3 to 10 parts by weight.

6. The composition of claim 5 in which the fibers are cellulosic fibers.

7. The composition of claim 1 in which (B) is from 40 to 120 parts by weight and (C) is 0.3 to 10 parts by weight cellulosic fibers.

* * * * *